(12) United States Patent
Benuzzi

(10) Patent No.: US 6,178,864 B1
(45) Date of Patent: Jan. 30, 2001

(54) PANEL SAWING DEVICE

(75) Inventor: Piergiorgio Benuzzi, Bologna (IT)

(73) Assignee: Giben Impianti S.p.A., Bologna (IT)

( * ) Notice: Under 35 U.S.C. 154(b), the term of this patent shall be extended for 0 days.

(21) Appl. No.: 09/272,409

(22) Filed: Mar. 19, 1999

(30) Foreign Application Priority Data

Mar. 31, 1998 (IT) .......................................... BO98A0208

(51) Int. Cl.$^7$ ...................................................... B26D 5/00
(52) U.S. Cl. ........................... 83/863; 83/864; 83/885; 83/485
(58) Field of Search ............................. 83/863, 864, 885, 83/886, 485, 865, 884, 881, 51; 144/3.1, 42, 368

(56) References Cited

U.S. PATENT DOCUMENTS

| | | | |
|---|---|---|---|
| 1,691,102 | * 11/1928 | Witham, Sr. | 144/193.1 |
| 3,583,449 | * 6/1971 | Thrasher | 83/485 X |
| 4,009,741 | * 3/1977 | Zimmerman | 83/51 X |
| 4,204,445 | * 5/1980 | Goldinger | 83/881 X |
| 4,210,052 | * 7/1980 | Fisher | 83/881 X |
| 4,215,613 | * 8/1980 | Anderson et al. | 83/864 |
| 4,228,711 | * 10/1980 | Insolio | 83/881 |
| 4,300,604 | * 11/1981 | Zimmerman | 83/51 X |
| 4,534,256 | * 8/1985 | Benuzzi | 83/863 |
| 4,611,517 | * 9/1986 | Schmale | 83/428 X |
| 4,756,218 | * 7/1988 | Benuzzi et al. | 83/51 X |
| 4,819,532 | * 4/1989 | Benuzzi et al. | 83/485 X |
| 4,829,868 | * 5/1989 | Jenkner | 83/863 |
| 5,997,454 | * 12/1999 | Naldi | 83/485 X |

FOREIGN PATENT DOCUMENTS

| | | | |
|---|---|---|---|
| 2159427 | * 6/1973 | (DE) | 83/51 X |
| 912673 | * 12/1962 | (GB) | 83/881 X |

* cited by examiner

Primary Examiner—M. Rachuba
(74) Attorney, Agent, or Firm—Fay, Sharpe, Fagan, Minnich & McKee, LLP

(57) ABSTRACT

A device for sawing stacks of panels comprises cutting means consisting of a pair of similar carriages located on opposite sides of the stack. Each carriage mounts a first and a second circular saw and a first and a second circular scoring saw. Both carriages can move in two directions along an axis transversal to the feed axis of the stack so as to make a first and a second cut to corresponding defined first and second cutting depths and substantially coinciding in a vertical plane in such a way as to saw right through the stack of panels.

20 Claims, 4 Drawing Sheets

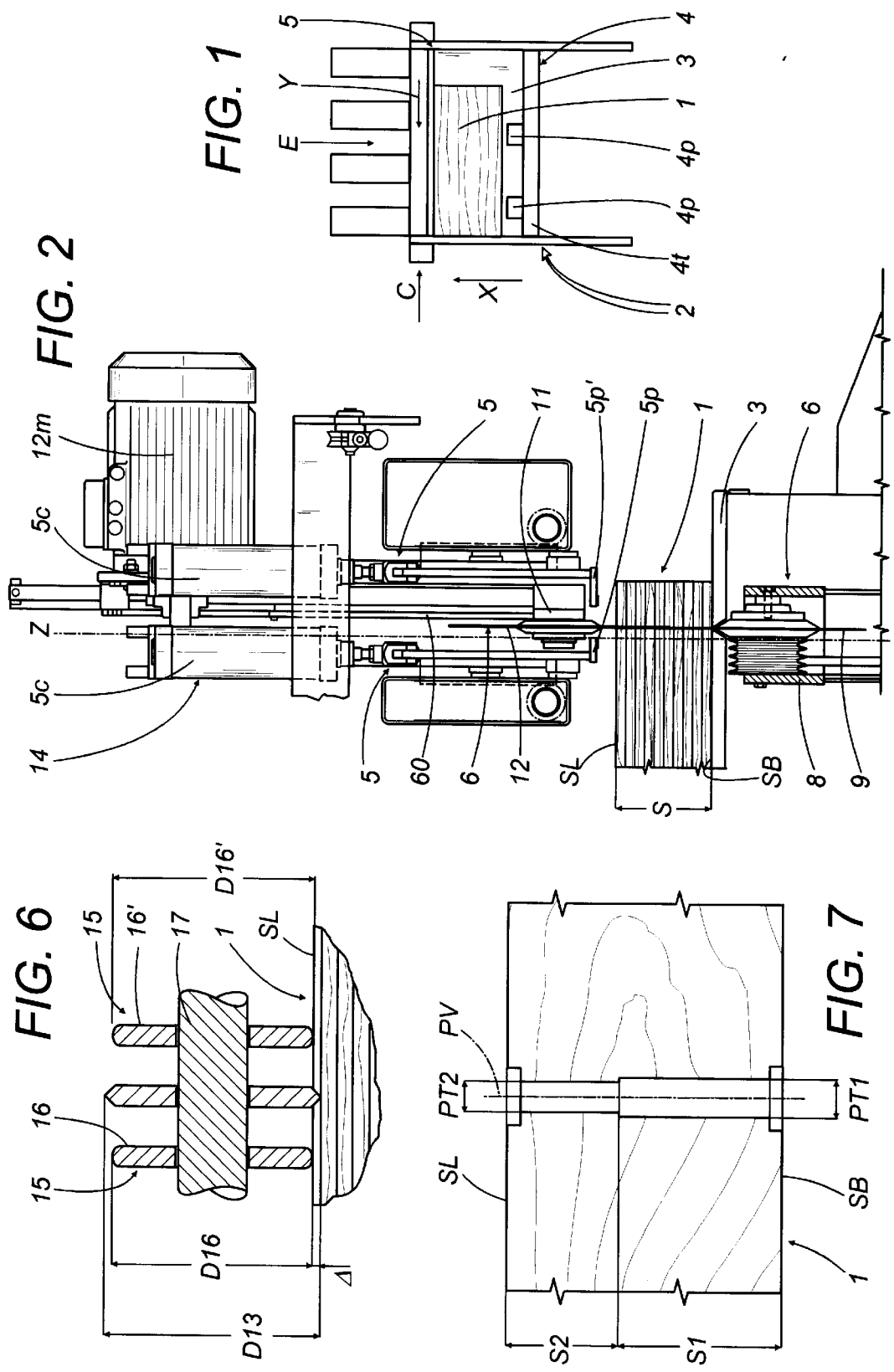

PANEL SAWING DEVICE

BACKGROUND OF THE INVENTION

The present invention relates to a device for sawing panels, particularly wooden panels, on panel sawing machines.

Panel sawing machines known up to the present time, in their minimum standard configurations, basically comprise: a horizontal table to support the stacks of panels to be cut; a gripper and handling unit designed to pick up the stack of panels at one end and feed it along a horizontal axis X towards the end of the table where there is a pressing device which holds down one end of the panel stack. In the area where the hold-down device is mounted, there is also a motor-driven carriage which mounts a circular saw and, in front of the latter, a scoring saw. The carriage moves in both directions along an axis Y transversal to the panel feed axis X, so as to allow the stack of panels to be scored on the surface and then cut through in the area where it is being held by the hold-down device. As is known, the scoring saw used in combination with the saw is designed to make only a shallow cut in the surface of the panel (usually the covering layer) in a direction such as to prevent surface splintering.

The higher production capacities of panel processing lines made possible by continuing technological improvements have greatly increased the demand for larger and larger quantities of panels cut to size to feed the panel processing lines. This demand has been met by simply using saw blades with larger and larger diameters so as to enable higher and higher stacks of panels to be cut.

This, however, has led to a number of practical disadvantages. Large circular saw blades bend more easily than smaller blades and consequently, offer lower cutting performance and the saw teeth are subject to more rapid wear. Another factor which determines the rapid wear of large blades is the high pressure exerted by the stacked panels on both sides of the blade in the area just cut (due to tension caused by the cooling of the material during the production cycle). The rapid wear of these large blades often results in macro-splintering (especially of the panel at the top of the stack) which requires additional machining to a considerable depth to smooth out the splintered surface of the stack just cut.

Moreover, these large circular saw blades are relatively slow-working, not entirely reliable in terms of technology and quality and expensive to run because they need high-powered motors to drive them and frequent sharpening operations.

SUMMARY OF THE INVENTION

The aim of the present invention is to overcome the above mentioned disadvantages by providing a panel sawing device for panel sawing machines that is at once compact and fast, offers excellent cutting precision for high stacks of panels, and whose overall structure occupies a minimum of space.

BRIEF DESCRIPTION OF THE DRAWINGS

The technical characteristics of the invention according to the above mentioned aims are described in the claims below and the advantages of the invention will become more apparent from the detailed description which follows, with reference to the accompanying drawings, which illustrate preferred embodiments of the invention and in which:

FIG. 1 is a schematic top plan view of a panel sawing machine equipped with the sawing device made in accordance with the present invention;

FIG. 2 shows the cutting device applied to the machine illustrated in FIG. 1, in a front view from direction C in FIG. 1, with some parts in cross section and others cut away in order to better illustrate others;

FIG. 6 is a detail view of the device illustrated in FIG. 5 and from direction G in FIG. 5;

FIG. 7 is a front view in a very enlarged scale, showing the dimensions of the cut made by the device disclosed.

DESCRIPTION OF THE PREFERRED EMBODIMENTS

Figure 3:
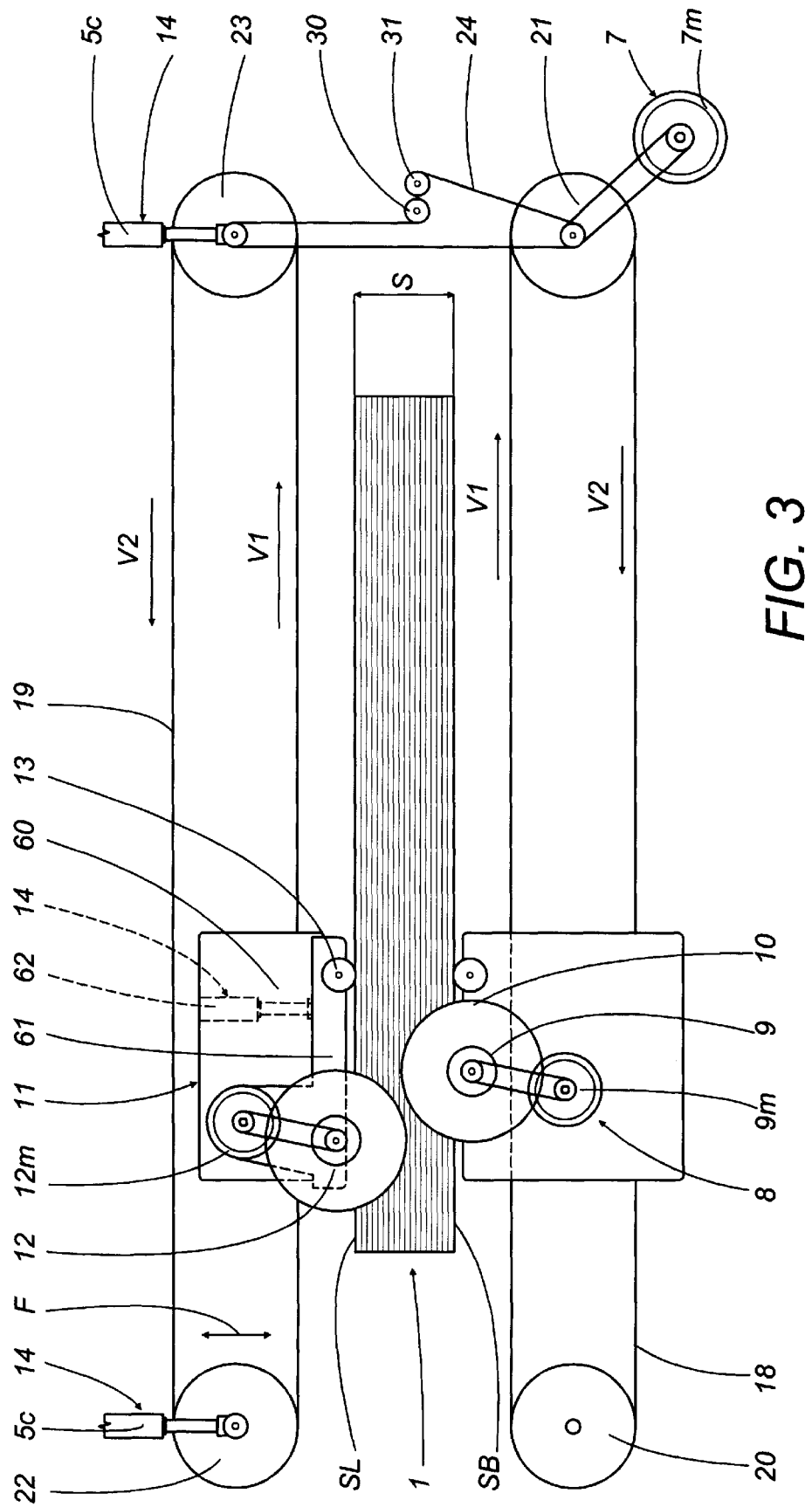
FIG. 3 shows the sawing device forming the subject-matter of the present invention in a schematic view from direction E in FIG. 1 and with some parts cut away in order to better illustrate others.

With reference to the accompanying drawings, in particular, FIGS. 1 and 2, the sawing device disclosed can be applied to machines for sawing stacks 1 of panels.

As can be seen in FIG. 1, a panel sawing machine 2 in a basic, standard configuration (illustrated purely by way of example and without restricting the scope of the invention), comprises the following parts: a horizontal table 3, supporting a tall stack 1 of panels having a preset height S; a gripper and handling unit 4 designed to pick up the stack 1 of panels and feed it on the table 3 along a horizontal axis X towards a part of the table 3 where there are means 5 for pressing down on a portion of the stack 1 of panels and which can move vertically in both directions.

As shown in FIGS. 1 and 2, the gripper and handling unit 4, which is of a known type, consists basically of a cross-beam 4t that moves along the axis X and mounts two or more grippers 4p designed to grip the stack 1; the pressing means 5, also of a known type, consist (see FIG. 2 in particular) of vertical, parallel hold-downs 5p and 5p' that move vertically and are designed to come into contact with the free surface SL of the stack 1 of panels in such a way as to press down on the panels.

In the space between the two hold-downs 5p and 5p' there are means 6 for cutting the stack 1 and driven by means 7 (described in more detail below) in both directions along an axis Y transversal to the axis X: thus the cutting means 6 perform a cutting stroke to make a first cut in the stack 1 to a cutting depth S1 in a first direction V1 and an idle return stroke in a direction V2 opposite to the first.

Figure 4:
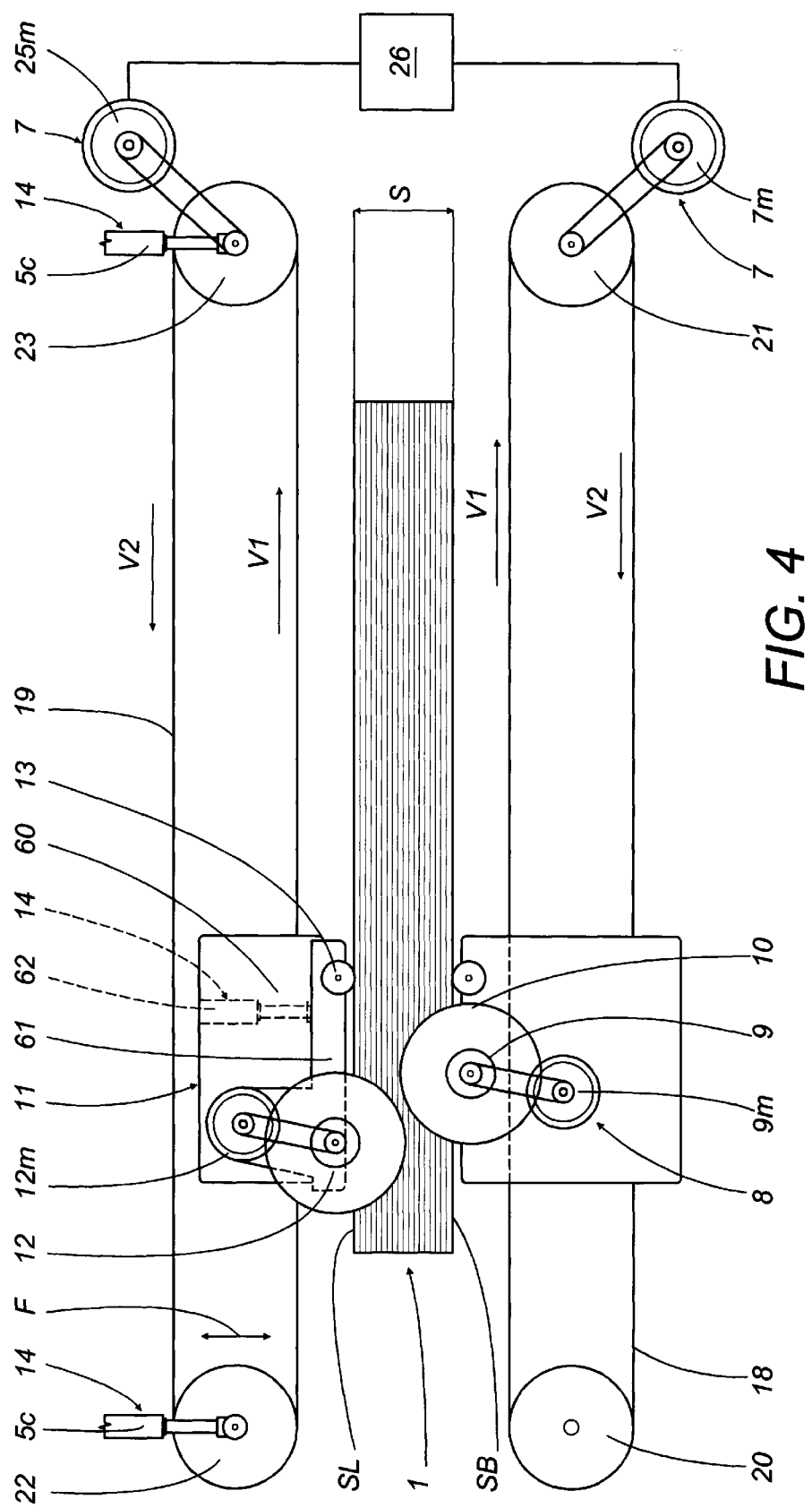
FIG. 4 shows another embodiment of the sawing device forming the subject-matter of the present invention, in a schematic view from direction E in FIG. 1 and with some parts cut away in order to better illustrate others.

As can also be seen in FIGS. 3 and 4, the cutting means 6 consist of a first carriage 8 that mounts a circular saw blade 9, with related drive motor 9m, and a circular scoring saw 10 for the stack 1, located upstream of the blade 9 relative to the cutting direction V1.

The cutting means 6 comprise a second carriage 11, mounting a second circular saw blade 12, with related drive motor 12m, and a second circular scoring saw 13 located opposite the first carriage 8 on the other side of the stack 1 of panels.

Like the first carriage 8, the second carriage 11 also moves in the two cutting and return directions V1 and V2, along the transversal axis Y, in synchrony with the first carriage 8, in such a way as to make a second cut, to a depth S2, that substantially coincides with the first cut in a vertical plane labelled PV: in this way (as clearly shown in FIG. 7) a complete cut is made right through the stack 1 of panels.

Looking in more detail, still with reference to FIGS. 2, 3, 4 and 5, the first carriage 8, which we shall call "lower" carriage, is mounted below the table 3, while the second carriage 11, which we shall call "upper" carriage, is located above the free surface SL of the stack 1 of panels.

With a configuration of this kind, the second carriage 11 can be driven along a vertical axis Z, that is, adjusted in height, by related means 14 according to the height S of the stack 1 of panels in such a way that its end position is always near the free surface SL of the stack.

Figure 5:
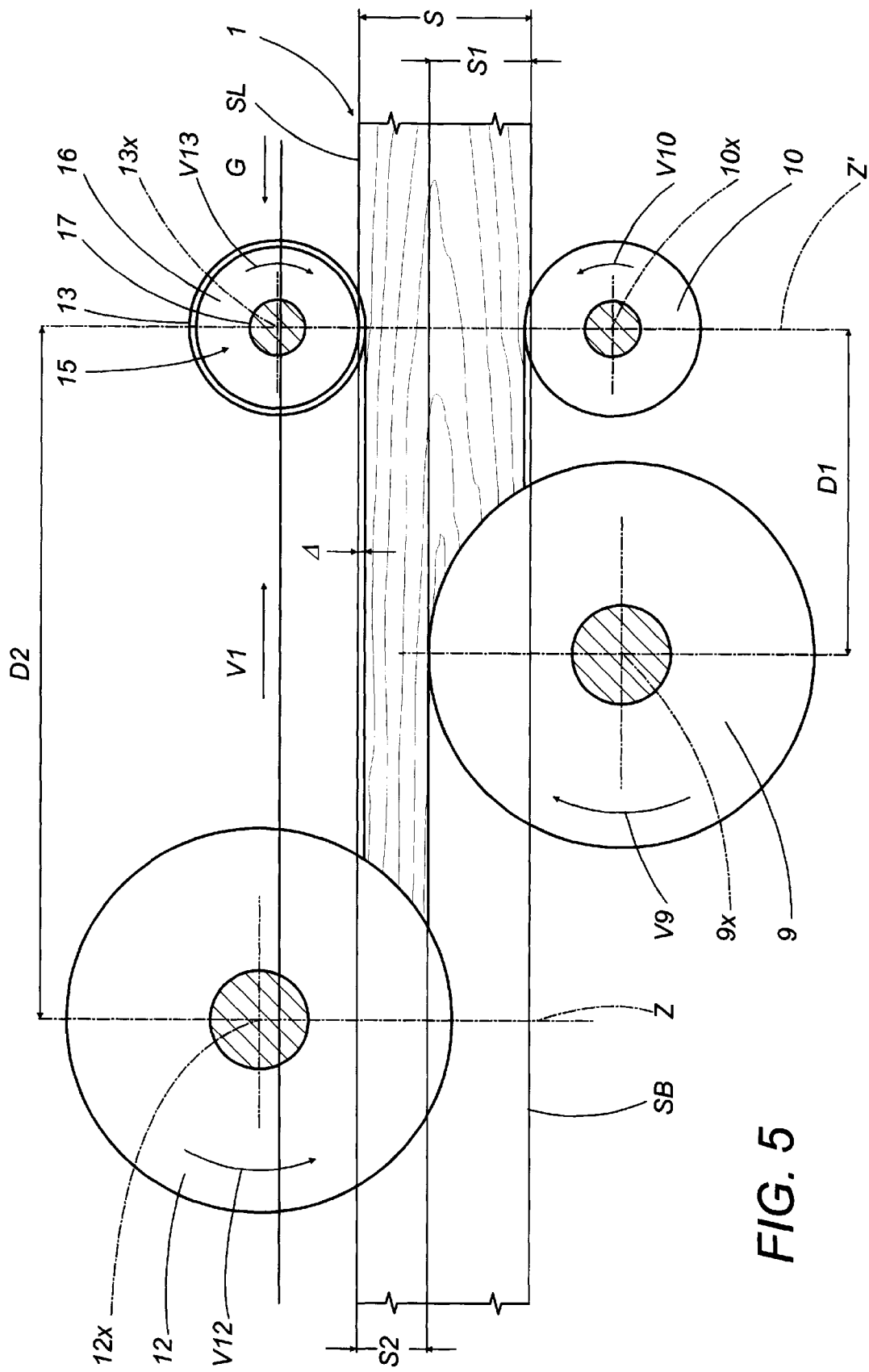
FIG. 5 is a detail view from FIGS. 3 and 4, showing the saw blades in a more enlarged scale than FIGS. 3 and 4.

As shown in FIGS. 5 and 7, the first, lower blade 9 can make a cut to a depth S1, starting from the base or lower surface SB of the stack 1 of panels through at least half the height S of the stack 1 of panels. In a preferred, non-restrictive embodiment, the first blade 9 cuts the stack 1 of panels starting from the base or lower surface SB to a depth S1 that is slightly greater than the stack height S.

In terms of structure, the first and second saw blades 9 and 12 may be mounted in such a way that their axes of rotation 9x and 12x are offset relative to a reference axis Z so that the two blades do not interfere with each other. Thus, the second blade 12 is located upstream of the first blade 9 relative to the cutting direction V1, that is to say, it follows the first blade 9 and comes into contact with the stack 1 of panels after the first blade 9.

Also, the distance D2 between the second blade 12 and the corresponding second scoring saw 13 is greater than the distance D1 between the first blade 9 and the corresponding first scoring saw 10: this difference is shown clearly in FIG. 5 (which illustrates a preferred embodiment without restricting the scope of the invention), where the first and second scoring saws are exactly over each other on opposite sides of the stack 1, corresponding to the surfaces SL and SB of the stack 1. In other words, the axes 10x and 13x lie on the same reference axis Z'.

Again with reference to FIGS. 5 and 7, notice that the diameters of the first and second blades 9 and 12 are the same, while their widths of cut are not, the width PT1, of the cut made by the first blade 9 being slightly larger than the width PT2 of the cut made by the second blade 12 (the difference is minimal, in the order of two or three tenths of a millimeter, but much enlarged in FIG. 7 to better illustrate it).

During the cutting stroke V1, the first blade 9 and the first scoring saw 10, turn in directions labelled V9 and V10 in FIG. 5, which are opposite to the directions V12 and V13 of the second blade 12 and the second scoring saw 13.

In a preferred, non-restrictive embodiment, the second, upper carriage 11, consisting (see FIG. 2) of a plate 60 which mounts the second blade 12, the second scoring saw 13 and the drive motor 12m of the blade 12, may be connected to, and may move together with, the pressing means 5 of the stack 1 of panels, the latter being located in the space between the two hold-downs 5p and 5p', so as to make use of the cylinders 5c that drive the hold-downs themselves (and constituting the above mentioned drive means 14).

In another embodiment (see dashed lines in FIGS. 3 and 4), the second carriage 11 may be adjusted along the vertical axis Z independently of the pressing means 5. In this case, the second carriage 11 consists of the vertical plate 60, divided into two parts 60 and 61 connected to each other.

The first part 60 is fixed and is connected to the saw blade drive means 7, while the second part 61 mounts the blade 12, the corresponding scoring saw 13 and the drive motor 12m of the blade 12, and can slide relative to the first part 60, being driven in both directions along the vertical axis Z by one or more cylinders 62 (which in practice form the above mentioned drive means 14) acting on said second part 61 of the second carriage 11 and connected to a frame that is attached to the other part 60 of the second carriage 11.

The second carriage 11 moves up and down to adjust to the different heights of the stack 1 of panels and, to do this, is equipped with detector means 15, located near the second scoring saw 13 and designed to enable the second scoring saw to be correctly positioned on the free surface SL of the stack 1 of panels.

The detector means 15, see FIG. 6, may consist of idle rollers 16 and 16' which come into contact with the free surface SL and which are keyed to a shaft 17 that mounts the second scoring saw 13 in such a way that they can rotate and are located on both sides of the second scoring saw.

The detector rollers 16 and 16' have diameters D16 and D16' that are slightly smaller than the diameter D13 of the second scoring saw 13. The difference A between the radius of the rollers and the radius of the scoring saw is equivalent to the depth of the score made by the second scoring saw 13 in the free surface SL of the stack 1.

In another, simplified embodiment, the ends of the hold-down elements 5p and 5p' of the pressing means 5 are used to directly reference the second scoring saw 13 and thus perform the function of the detectors 16 and 16'.

FIGS. 3 and 4 show two different embodiments of the units that drive the carriages 8 and 11.

In the first embodiment, illustrated in FIG. 3, the first and second carriages 8 and 11 are connected to respective branches of corresponding drive chains or belts 18 and 19, which are looped around respective first and second pairs of pulleys 20, 21 and 22, 23 which drive them in the two directions V1 and V2. One pulley 21 and 23 of each carriage 8 and 11 is kinematically connected to the other by a third, shared chain or belt 24 which enables both carriages 8 and 11 to be driven in a synchronized fashion by a single motor 7m.

In this specific case, the third chain 24 has a transfer roller 30 and a dandy roller 31 to keep the third chain 24 properly tensioned as it turns during adjustments in height (see arrow F in FIG. 3) of the second carriage 11.

In the second embodiment, illustrated in FIG. 4, the drive unit of the two carriages 8 and 11 is similar to that described above but differs mainly in that there are two independent motors 7m and 25m connected to the respective pulleys 21 and 23 of the two carriages 8 and 11. The drive motion to the two chains or belts 18 and 19 is synchronized by a control unit 26 (illustrated as a block) which may consist of a software or numerical control unit located on the panel sawing machine.

A device made in this way achieves the above mentioned aims thanks to its extremely simple structure for panel sawing machines required to cut tall stacks of panels.

The device has numerous advantages stemming from the fact that it allows small blades to be used. That means the blades are less likely to bend and can therefore be thinner while maintaining a sharp cutting edge for longer periods.

Moreover, the use of two carriages with smaller blades allows the carriages themselves to achieve higher feed rates than known devices, thus increasing the productivity of the machine.

The two saw blades, each with a corresponding scoring saw, designed to cut into the panels from both sides of the stack produce less waste and greatly reduces splintering on the free surface of the stack.

The invention described can be subject to modifications and variations without thereby departing from the scope of the inventive concept. Moreover, all the details of the invention may be substituted by technically equivalent elements.

What is claimed:

1. A device for sawing stacks of panels comprising:
    a table to support a stack of panels having a preset height and an upper free surface;
    means for pressing down on a portion of the stack of panels and which can move vertically in both directions, said pressing means adapted for immovably securing the stack of panels on said table when said stack of panels is cut;
    a gripper and handling unit designed to pick up the stack of panels and feed it on the table along a horizontal feed axis towards a part of the table where said means for pressing down on a portion of the stack of panels are located;
    means for cutting the stack, when the stack is immovably secured by said pressing means, said cutting means driven in first and second opposite directions along an axis transverse to the feed axis in such a way as to perform a cutting stroke to make a cut in the stack to a defined cutting depth in the first direction and an idle return stroke in the second direction, said cutting means comprising: (i) a first carriage that mounts a first circular saw blade and a first circular scoring saw for the stack, said first scoring saw located relative to the first circular saw blade and relative to the first direction so that said first scoring saw comes into contact with the stack before the first circular saw blade does, and, (ii) a second carriage that mounts a second circular saw blade and a second circular scoring saw and that is located opposite the first carriage on an opposite side of the stack of panels relative to the first carriage, the second carriage moving in the first and second directions along the transverse axis in synchrony with the first carriage, wherein said first and second circular saw blades are aligned with each other in a vertical plane and make respective first and second cuts in the stack to respective first and second defined cutting depths in such a way as to make a complete cut through the stack of panels.

2. The device according to claim 1, wherein the first carriage is located below the table, while the second carriage is located above the free surface of the stack of panels.

3. The device according to claim 1, further comprising:
    means for adjusting a height of said second carriage along a vertical axis according to the height of the stack of panels in such a way that said second carriage is always adjacent the free surface of the stack, wherein said first carriage is fixed relative to the table.

4. The device according to claim 1, wherein the first blade cuts the stack of panels starting from a lower surface of the stack to a depth that is at least half the height of the stack of panels.

5. The device according to claim 1, wherein the first blade cuts the stack of panels starting from a lower surface of the stack to a depth that is slightly greater than the height of the stack of panels.

6. The device according to claim 1, wherein the second blade is located upstream of the first blade relative to the first direction so that it comes into contact with the stack of panels after the first blade.

7. The device according to claim 1, wherein the axes of rotation of the first blade and second blade are offset relative to a reference axis so that the two blades do not interfere with each other.

8. The device according to claim 1, wherein the second blade is located upstream of the first blade relative to the first direction so that it comes into contact with the stack of panels after the first blade; and wherein a distance between said second blade and the corresponding second scoring saw is greater than a distance between the first blade and the corresponding first scoring saw, said first and second scoring saws lying along a common vertical reference axis on opposite sides of the stack.

9. The device according to claim 1, wherein the first blade defines a cutting width that is larger than a cutting width of the second blade.

10. The device according to claim 1, wherein that the first and second circular saw blades are equal in diameter.

11. The device according to claim 1, wherein the carriage that mounts the second blade and the second scoring saw is connected to, and moves together with, the means for pressing down the stack of panels.

12. The device according to claim 1, wherein the second carriage comprises:
    a plate divided into first and second separate but connected parts that can slide relative to each other, wherein said first part mounts the second blade and the second scoring saw and is vertically adjustable in both directions relative to the second part of the plate according to the height of the stack of panels.

13. The device according to claim 1, further comprising:
    detector means located adjacent the second scoring saw and designed to enable the second scoring saw to be correctly positioned on the free surface of the stack of panels.

14. The device according to claim 13, wherein the detector means comprises:
    at least one idle roller, which touches the free surface of the stack and which is keyed to a shaft that mounts the second scoring saw.

15. The device according to claim 14, wherein the second scoring saw is equipped with two idle rollers, located adjacent opposite sides of the second scoring saw and keyed to the shaft that mounts the second scoring saw.

16. The device according to claim 14, wherein the detector rollers are smaller in diameter than the second scoring saw.

17. The device according to claim 1, wherein the first and second carriages are connected to respective branches of corresponding drive chains, said drive chains looped around respective first and second pairs of pulleys which drive the first and second carriages in the first and second directions; at least one pulley of each carriage being kinematically connected to the other by a third, shared chain which enables both carriages to be driven by a single motor.

18. The device according to claim 1, wherein the first and second carriages are connected to respective branches of corresponding drive chains, said drive chains looped around respective first and second pairs of pulleys which drive the first and second carriages in the first and second directions; at least one pulley of each carriage being connected to respective first and second independent motors both connected to a control unit which synchronizes the drive of both the first and the second carriage.

19. The device according to claim 1, wherein the first blade and the first scoring saw turn in directions which are opposite to the directions of the second blade and the second scoring saw, respectively.

20. The device according to claim 2, further comprising:

means for adjusting a height of said second carriage along a vertical axis according to the height of the stack of panels in such a way that said second carriage is always adjacent the free surface of the stack, wherein said first carriage is fixed relative to the table.

* * * * *